United States Patent
Täger

(10) Patent No.: US 6,751,262 B1
(45) Date of Patent: Jun. 15, 2004

(54) DATA TRANSMISSION METHOD

(75) Inventor: Wolfgang Täger, Munich (DE)

(73) Assignee: Polytrax Information Technology Akgiengesellschaft, Munich (DE)

( * ) Notice: Subject to any disclaimer, the term of this patent is extended or adjusted under 35 U.S.C. 154(b) by 0 days.

(21) Appl. No.: 09/479,160

(22) Filed: Jan. 7, 2000

(30) Foreign Application Priority Data

Jan. 7, 1999 (DE) .......................... 199 00 324

(51) Int. Cl.⁷ .................. H04L 5/26; H04L 25/08
(52) U.S. Cl. .................. 375/260; 375/316; 375/350; 342/375
(58) Field of Search .................. 375/260, 316, 375/350; 370/210; 342/375

(56) References Cited

U.S. PATENT DOCUMENTS

| | | | |
|---|---|---|---|
| 4,538,136 A | 8/1985 | Drabing | 740/310.2 |
| 4,642,607 A | 2/1987 | Strom et al. | 340/310.7 |
| 6,631,175 B2 * | 10/2003 | Harikumar et al. | 375/350 |

FOREIGN PATENT DOCUMENTS

| | | |
|---|---|---|
| DE | 3519408 | 5/1985 |
| DE | 3626033 | 8/1986 |
| DE | 3828623 | 8/1988 |
| DE | 3919530 | 6/1989 |
| DE | 4001265 | 1/1990 |
| DE | 4001266 | 1/1990 |
| DE | 4236310 | 10/1992 |
| DE | 4323376 | 7/1993 |
| EP | 0365350 | 10/1989 |
| EP | 0577861 | 7/1992 |
| GB | 2296165 * | 9/1996 ............. H04L/5/06 |
| JP | 57180248 | 11/1982 |
| JP | 60153249 | 8/1985 |

OTHER PUBLICATIONS

Intellon Corporation. Intellon No New Wires White Paper #0032, "Intellon enhanced OFDM: High Speed No New Wires," pp. 1–7, Revision 2.0, Oct. 1998.
K. Dostert and W. Bartel, "Storischere Datenubertragung auf Strornversorgungsleitungen," pp. 1349–1354, Der Elektromeister+Deutsches Elektrohandwerk, 1989.

* cited by examiner

*Primary Examiner*—Chieh M. Fan
*Assistant Examiner*—Edith Chang
(74) *Attorney, Agent, or Firm*—Dorsey & Whitney LLP

(57) ABSTRACT

A data transmission method, particularly in electric networks, in which coded data are blockwise modulated onto several carrier frequencies within one or several particular frequency bands by an orthogonal frequency division multiplex method (OFDM) and in which the signal corresponding to a data block and obtained by inverse Fourier transformation is transferred to a receiver for a predetermined time duration (T), where individual signals succeed as signal blocks in time. In some embodiments, each signal is multiplied with a window function before transmission, the absolute value of the Fourier transform of which has a zero crossing at the respectively used carrier frequencies, and has secondary maxima, which have a damping of at least −30 dB in relation to the main maximum. In some embodiments, a digital filter can be used instead of the window function, the digital filter having an odd number of coefficients $C_k$, $k=-m, \ldots 0, \ldots, m$ with $C_{-k}=C_k$, the coefficients $C_k$ being chosen so that the transfer function of the filter has a damping of at least −30–50 dB outside the limits of the respectively used frequency bands.

13 Claims, 4 Drawing Sheets

DATA TRANSMISSION METHOD

CROSS-REFERENCE TO RELATED APPLICATION(S)

Figure 1:
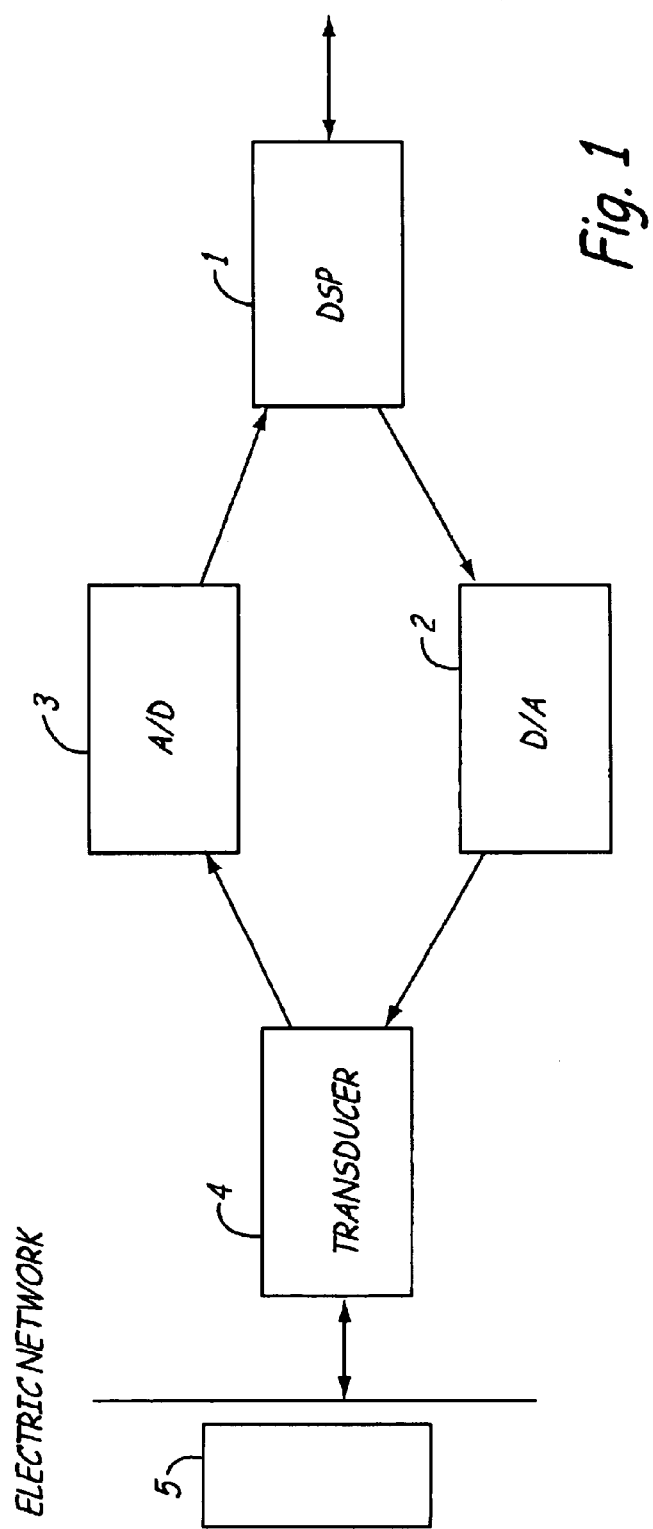

This application claims the priority of German patent application number DE 19900324 C1, filed Jan. 7, 1999, which is incorporated by reference.

The invention relates to a data transmission method, particularly in electric networks, in which coded data are blockwise modulated onto several carrier frequencies within one or several particular frequency bands by an orthogonal frequency division multiplex method (OFDM) and in which the signal corresponding to a data block and obtained by inverse Fourier transformation is transferred to a receiver for a predetermined time duration (T), where individual signals succeed as signal blocks in time.

Such methods are used in the power line transmission technique, for example. This attempts by suitable coding and modulation of the data to be transferred to transfer them unidirectionally and bidirectionally over the DC network to receivers. To this end in Europe the bands A to D are available according to the standard CENELEC EN 50065, the bands covering the following frequency ranges: 9–95, 95–125, 125–140, and 140–148,5 kHz, respectively. In the USA or in Japan frequency ranges of up to 500 kHz are available. Because almost all households and buildings are connected to electric networks, a data transmission by power lines is desirable and obviates the additional installation of two-wire lines, coaxial cables and optical fibres. Electric equipments like central heatings, and air conditioning and lighting equipments or machines can automatically be operated, controlled and monitored by switches, sensors and actuators, for example. To this end the existing electric network for energy transfer at 50 Hz is used to transmit high frequency signals. In this respect the different characteristics of the lines at the different high frequencies, the line drops and the locally varying characteristics of the transmission medium are problematic. Within the allowed bands of the European standard the input impedance for the fed signals increases with decreasing frequency. Another difficulty results from the variety of spurious signals in the electric networks. Particularly at low frequencies a strong large bandwidth noise exists. Television sets, computers and radio transmitters cause narrow bandwidth interferences with high power density. Additionally pulse interferences occur, which are caused by power-on and power-off operations and have peak voltages in the kV range. Their interference spectrum extends far into the MHz range because of the steep leading and trailing edges.

Transmission systems for electric networks with data rates on the order of several Mbit/s using bandwidths of several MHz are presently investigated. However, a high data transmission rate employing the frequency bands of the European standard is desirable.

For telecommunications over energy distribution networks a method is known (Intellon Corporation, 1998, White Paper #0032, IeOFDM High Speed No New Wires, Revision 2.0, http://www.intellon.com), in which data are transferred over AC lines by a well known orthogonal frequency division multiplex method. To this end the available frequency spectrum is divided into many narrow bandwidth areas, in which data are respectively coded by phase modulation of a carrier frequency. The OFDM modulation is generated by a fast Fourier transform (FFT) processor, the time signal being obtained by subsequent inverse Fourier transformation. By copying a signal portion of a few microseconds length located at the end of the signal to its beginning the signal block to be transferred is generated. The length of the copied portion depends upon the reflection period of the original signal in the transmission channel, respectively. The copy operation is designed to avoid an interference of the original signal block with its time delayed reflections. The achieved transmission rates should be 10 Mbit/s in a frequency band above 2 MHz.

It is the copy operation that proves to be disadvantageous with this well-known telecommunication method, because it leads to a discontinuous transition at the connection point, which is also the case, when the individual signal blocks are lined up. These discontinuities in the time range result in components in the frequency range, which there can overlap other carrier frequencies and which can cause interferences outside the allowed frequency band. Moreover, the reflection duration in the transmission channels and thereby the length of the signal portion to be copied varies.

The object of the present invention is to provide a data transmission method, especially for electric networks, which operates in narrow frequency bands with a high data transmission rate without causing interferences outside the used frequency band. Especially country specific standards have to be respected.

Preferred embodiments are set out in the subclaims.

According to the invention each signal is multiplied by a window function before transmission, the thus generated signal blocks being transferred successively in time. The window function mustn't cut off the signal at the margins, because discontinuities have to be avoided as far as possible, if high frequency interference components are to be eliminated. Therefore according to the invention a window function has to be chosen, the absolute value of the Fourier transform of which having the following characteristics: at the used carrier frequencies respective zero crossings have to exist and the secondary maxima have to have a damping of at least $-30$ dB in relation to the main maximum (at the frequency 0). The first condition guaranties that there is an orthogonality for the used carrier frequencies, which means that the resulting signal, which represents a linear combination of harmonic functions distributed among the carrier frequencies is composed without mutual interference of, the respective functions and hence carriers and can thus be decomposed uniquely into the individual carrier components. The second condition guarantees that outside the carrier frequency range a fast decrease of the power spectrum takes place. This especially allows the fulfillment of mandatory standards when using particular frequency ranges in electric networks.

The joining of signal blocks of specific time duration in the time range corresponds to the multiplication of a signal with a square window of time duration T, the resulting signal blocks subsequently being joined in time. The multiplication in the time range corresponds to a convolution in the frequency range. The interferences caused in the frequency range are the smaller, the wider the square window is chosen in the time range. In the well-known Intellon method the copying of a narrow time signal portion therefore results in broadband interferences.

A square window of time duration T has respective zero crossings at multiples of the value $1/(2\times T)$, at which places the carrier frequencies can be placed without overlapping of information of other carriers. However it remains disadvantageous that the high frequency components generated by the square window are damped only very slowly. This results in the above-mentioned spurious frequencies outside the used frequency band and thus to an incompatibility with the standard.

Therefore according to the invention a window has to be used, which has as many zero crossings as possible within the allowed frequency band, to avoid limiting the number of carriers, and which also has a strong damping, which has to be at least −30 dB outside the main maximum. To fulfil these requirements, even only every second of the interesting carrier frequencies in a square window can be used, if the damping condition can be fulfilled thereby. Especially desired are dampings which already from the second secondary maximum on are at least −50 to −60 dB.

A possible window function can be represented by the following formula:

$$window(n) = c_0 + \sum_{i=1}^{I} c_i \cos\left((2i-1)2\pi \frac{(n+0.5)}{NFFT}\right)$$

Here NFFT represents the number of points used for the inverse Fourier transformation in the signal generation. n runs from 0 to (NFFT-1) corresponding to the time interval from $t_0$ to $t_0+T$. The coefficients $c_i$ can be chosen so that the Fourier transform of this function decreases as rapidly as possible and has already at the second secondary maximum a damping of at least −50 dB. For I=2 these coefficients can be represented as follows:

$c_0$=0.5093
$c_1$=−0.4941
$c_2$=0.0059

This window (illustrated in FIG. 3) satisfies the orthogonality condition at least at every second carrier frequency (in comparison to the square window). The damping condition is also satisfied with already the second secondary maximum having decreased to −59 dB.

In the data transmission method according to the invention the data are preferably modulated by quadrature amplitude modulation (QAM) in combination with OFDM. Here 2, 4, 8, 64, 128, 256 etc. pieces of information can be coded by phase and/or amplitude modulation with 8 bits per carrier being coded in a 256-QAM. In this respect it is favourable to distribute the information equidistantly upon neighbouring squares in the complex space, the size of which is predetermined by the phase and amplitude uncertainty of the transmission path.

The method according to the invention can particularly be used for the transfer of data in the B and D bands of the Cenelec standard. The signals can then be distributed in the low voltage distribution network, for example, with an "intra-building" data transmission being especially favourable.

It is favourable to generate the signal by a digital signal processor in the frequency space, to transform it by inverse Fourier transformation into the time space where it is multiplied by the time window according to the invention and successively converted by a digital/analog converter so that it can be fed into the transmission carrier. This method allows a high transmission rate because of the very rapidly performable Fourier transformations and thus telecommunications in real-time.

Because the generated signal blocks can contain little energy at the beginning and the end, they can be overlapped in order to increase the number of blocks per second. This way a data transmission rate comparable to the ISDN rate can easily be achieved.

The method according to the invention can also be used for the bidirectional data transmission apart from the unidirectional data transmission by dividing the number of carrier frequencies into a transmission channel and a return channel. Also favourable is another synchronisation channel for which a carrier frequency can be reserved. The synchronisation channel allows the permanent synchronisation of several stations without a minor quartz-drift leading to big deviations in the long term.

In accordance with the type of the data transmission it may be necessary to transfer data in real-time, i.e. without delays (e.g. in telecommunications) or to transmit the data reliably and error free in binary form with delays being permissible. For error correction the overall data to be transmitted can be distributed into two packages with one number of bits being used as control bits. In this respect the use of BCH codes is preferable.

The data transmission rate can be increased by using a transmission and a return channel, if both channels have the same carrier frequencies. The requirement for this is a transmission path with low reflections.

Another possibility of data transmission is to feed each signal through a digital filter before transmission, the transfer function of the filter having a damping of at least −30 dB outside the respectively used frequency bands with all carriers within the allowed bands—instead of every second one in the window technique—being usable, whereby the data rate is doubled. The digital filter operates with a linear phase, i.e. it has symmetric coefficients ($c_{-k}=C_k$) and an odd number of coefficients (k=−m, . . . , 0, . . . m). Because the signal block is prolonged in time by the use of a digital filter, the individual blocks mustn't be transferred directly succeeding in time. It proves to be advantageous to choose about 10% of the block length as time separation between the signal blocks. In the selection of the filter coefficients the damping condition, i.e. a strong damping outside the used frequency bands, and the orthogonality condition, i.e. the avoidance of a mutual interference of the carriers, is to be respected.

In comparing both data transmission methods according to the invention by employing a window function and by digital filtering of the respective signal blocks, respectively, the following can be noted: the digital filtering technique requires more computational overhead than the window technique, and moreover the orthogonality requirement can not entirely be satisfied. On the other hand twice the number of carrier frequencies can be used and even at low signal-to-noise ratios on the transmission path a reliable data transmission can be realised. Finally the signal blocks can be overlapped in time in the window technique, whereas they are prolonged in time in the digital filtering technique.

In the following an embodiment of the invention will be explained in more details.

Figure 2:
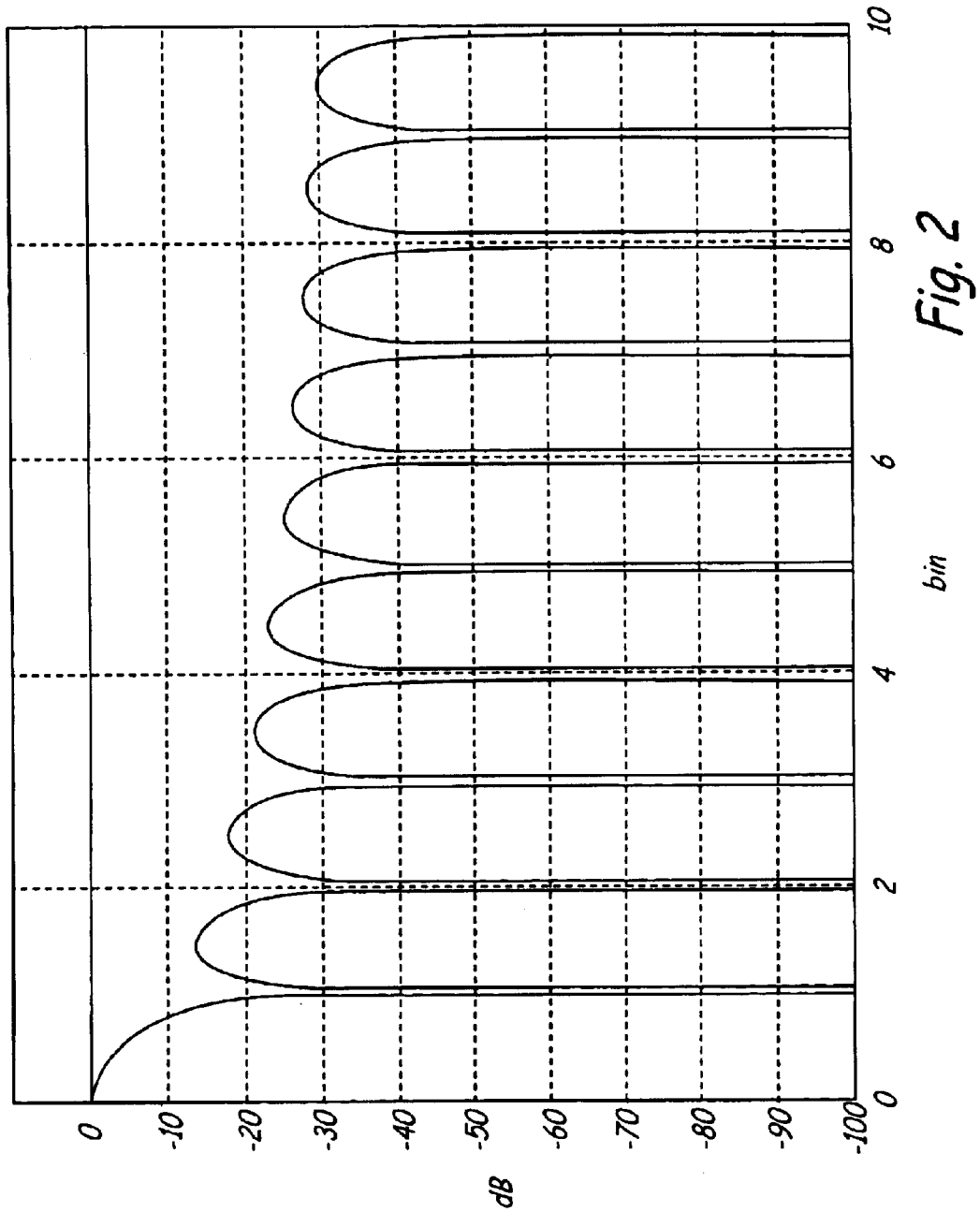
Figure 3:
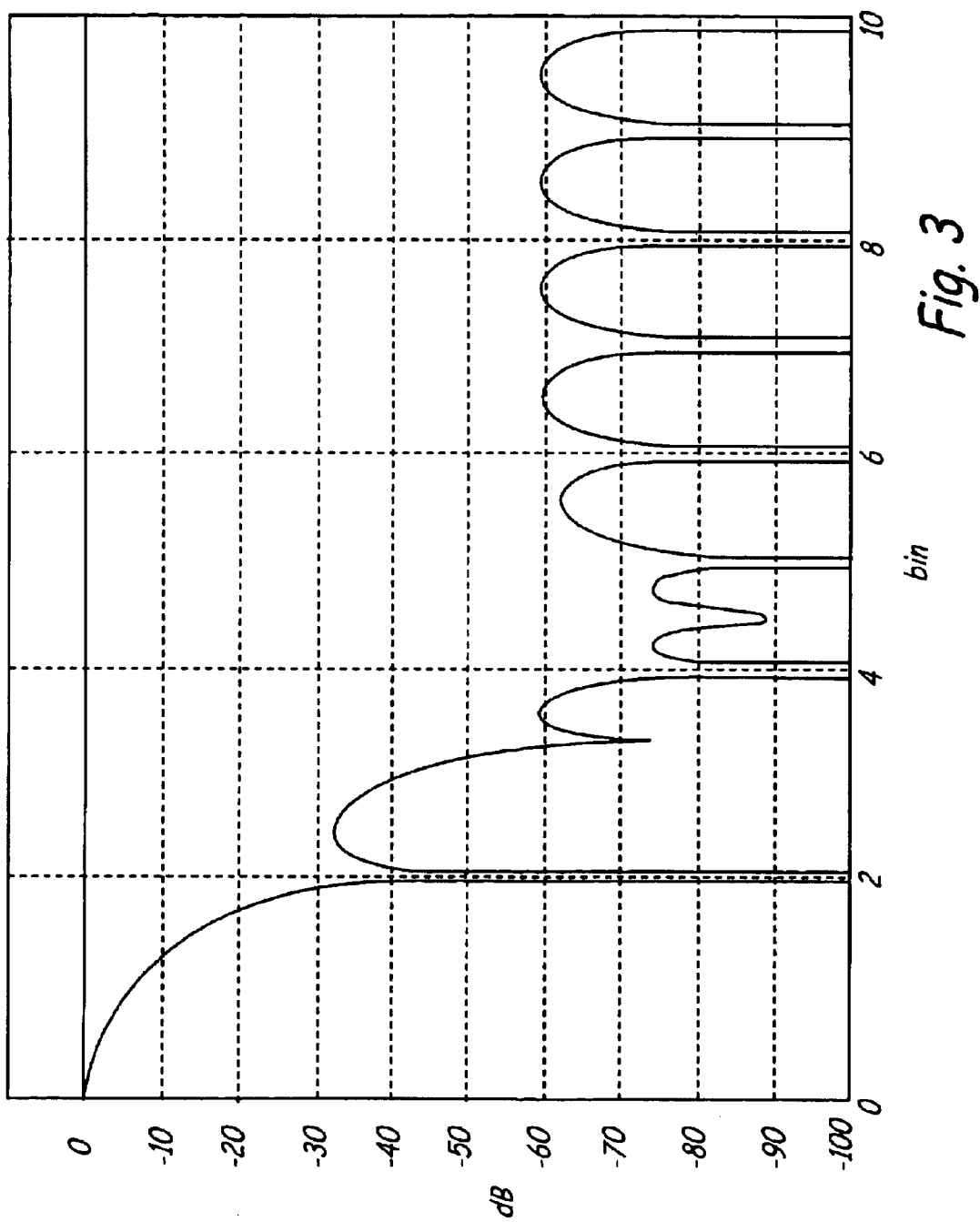
Figure 4:
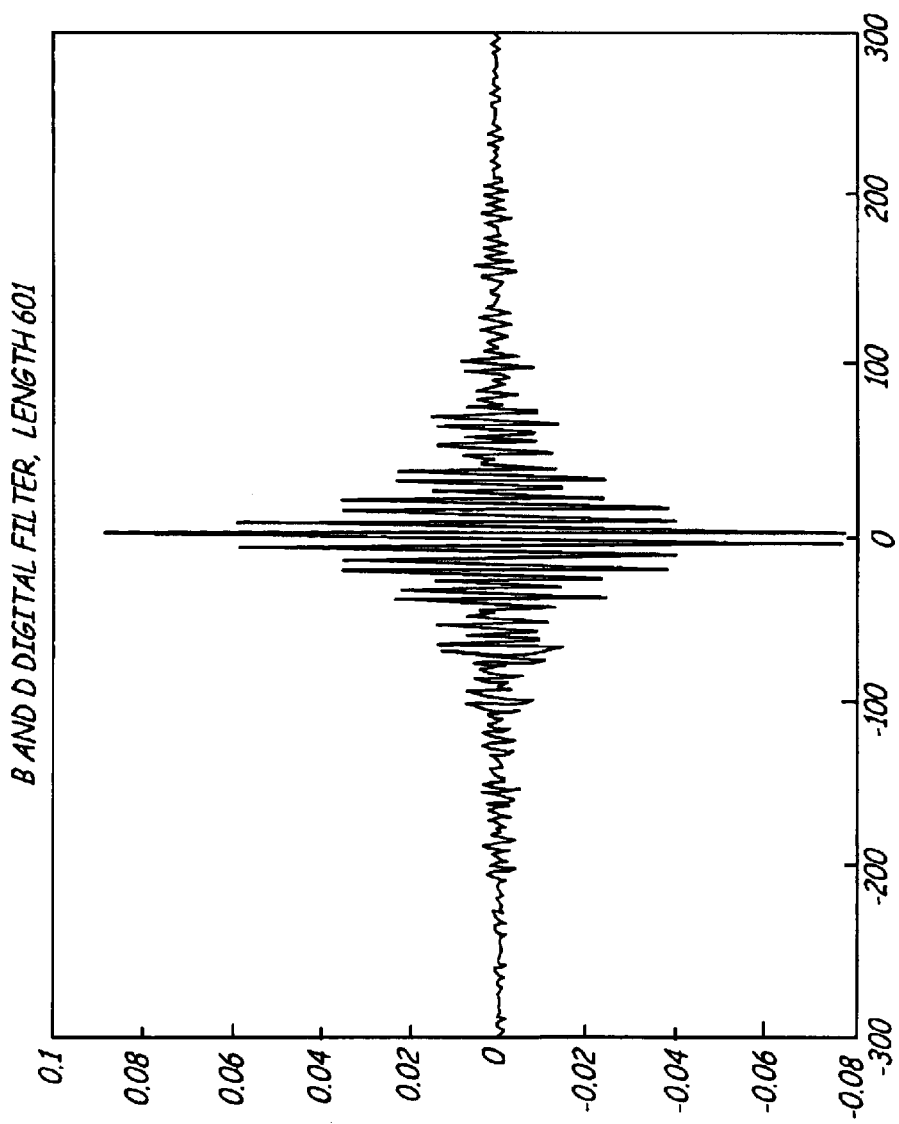

FIG. 1 schematically shows an arrangement suitable for the data transmission over electric networks according to the invention, FIG. 2 shows the Fourier spectrum of a square window, FIG. 3 shows the Fourier spectrum of a window function according to the invention, and FIG. 4 shows the coefficients ck of a digital filter according to the invention.

FIG. 1 schematically shows an arrangement for data transmission in an electric network 5 according to the invention. The data coded and modulated by a digital signal processor (DSP) 1 are fed by a DA converter 2 with a high sampling rate via a transducer 4 into the electric network 5. On the reception side the received signals are fed by an AD converter 3 in digital form to the signal processor 1, where they are demodulated and decoded.

The usable data are transferred to the signal processor 1, where they are digitised, e.g. with an accuracy of 8 bits, by a QAM-OFDM-method (256-QAM). The modulation is performed preferably by allocating amplitude and phase values to each of the 256 values in the complex space so that the values form equidistant lattice points there. The distance between two points is given by the quality of the transmission channel, which means that the points can be more closely spaced, when the signal noise is low and when there are small changes of the channel characteristics along the transmission path, without occurring a blurring of the points by the transmission in a way that can lead to a misallocation at the time of decoding. This way eight bits can be modulated onto one carrier frequency by amplitude and phase modulation.

In the present embodiment the B and D bands according to the CENELEC standard with an overall bandwidth of 38.5 kHz are to be used for data transmission. The highest usable frequency $f_{max}$ is then 148.5 kHz, so that the DA converter 2 has to be operated with a sampling frequency of over 300 kHz. The output voltage of the DA converter 2 is a step function which includes periodically occurring high frequency components. At a sampling rate $f_a$ the first high frequency component begins at the frequency $f_a-f_{max}$. These frequency components decrease proportionally to 1/f, however. It is therefore preferable to choose the sampling frequency higher, in order to keep the spurious frequencies caused by the DA converter 2 low. In the present case $f_a$=768 kHz can be chosen.

The usable information divided into different carrier frequencies is transformed by inverse Fourier transformation into a signal block (in time space), where the Fourier transform is carried out by NFFT-points. The length is preferably chosen to be at least 512 or 1024 or more points, and in the present case NFFT=4096. With predetermined sampling frequency $f_a$ the resulting distance between the carrier frequencies is df=$f_a$/NFFT. The inverse of the distance df corresponds to the length of the signal block, which is 5.3 ms in the present case. With maximum block durations of up to 30 ms a transfer can still be regarded as occurring in real time in telecommunications. The discrete frequencies ("bins") determined by the distance df represent frequencies, at which the Fourier spectrum of the signal block cut off by a square-wave function has respective zero crossings. In the present case the number of carriers would be about 204.

A signal block cut off by a square window can not be used for data transmission within a specific frequency band in practice, because the power decrease at higher frequencies is too small, as illustrated in FIG. 2. The European standard specifies a strong power decrease outside the used frequency band, i.e. the power spectrum of the appearing spurious frequencies has to decrease steeply. This could be achieved by a severe limitation of the carrier frequencies, e.g. by selecting only those carrier frequencies, which have a sufficient distance from the limits of the frequency band. In this way the data transmission rate would decrease to impractical values, however.

The invention therefore proposes multiplying the signal block with a window function, whose Fourier transform has a zero crossing at the used carrier frequencies and secondary maxima with increasing damping of at least −30 dB in relation to the main maximum. This assures that the highest used carrier frequency outside the allowed frequency band causes only very weak interferences declining with frequency. The requirement of zero crossings at the used carrier frequencies guarantees the above-mentioned orthogonality of the system.

When choosing the appropriate window it can be necessary and preferable to use only every second bin as carrier frequency. FIG. 3 shows the Fourier spectrum of a especially preferable window function $$window(n) = c_0 + \sum_{i=1}^{I} c_i \cos\left((2i-1)2\pi \frac{(n+0.5)}{NFFT}\right)$$

with n=0 to NFFT−1. For I=2 the coefficients are $c_i$:$c_0$=0.5093; $c_1$=−0.4941 and $c_2$=0.0059.

When using this time window it is apparent that the beginning and the end of the respective signal blocks receive little energy in the time period. Therefore the signal blocks can be overlapped to increase the data transmission rate. The data transmission rate when using the above-mentioned window function, which leads to a halving of the usable carriers, is about 153 kbit/s, for example. This data transmission rate can be maintained, even if the number of carriers of the transmission channels is reduced to 96, with carrier frequencies being occupied for a return channel and a synchronisation channel, when the overlapping of the signal blocks is about 6%.

The data transmission method according to the invention allows ISDN data transmission rates over the electrical network. The feeding is performed by means of a transducer 4, which operates bidirectionally and provides galvanic separation from the electrical network. The line frequency of 50 Hz is filtered, while there are good transmission characteristics for the used frequency bands.

It is favourable to suppress power-line disturbances appearing below and above the frequency bands by an analog bandpass filter on the analog reception side. This increases the dynamic range of the AD converter 3 and the data security.

In another embodiment of the data transmission method according to the invention instead of a time window a digital filter is used, which has a damping rate of at least −30 dB outside the respectively used frequency bands. To this end the binary coded data are delayed in a shift register and weighted with a predetermined coefficient sequence. This process can mathematically be represented as a convolution in the time space, which corresponds to a multiplication in the frequency space. In order to maintain the signal phase unchanged a digital filter with symmetrical coefficients $c_k$=$c_{-k}$ of length m (k=0, . . . ,m) is used, so that the overall length is odd. Suitable coefficients for m=300 are shown in FIG. 4 and represented in detail in columns in the following table:

| | | |
|---|---|---|
| −5.7206581e-004 | −1.8883509e-004 | −1.3812248e-003 |
| −2.4501353e-004 | −1.1491986e-004 | 1.1924051e-003 |
| −1.9397956e-004 | 8.8512726e-005 | 2.0450193e-003 |
| −6.5246694e-004 | 3.9113510e-004 | −4.9091997e-005 |
| −1.1427863e-003 | 5.9976039e-004 | −2.5300484e-003 |
| −5.8692693e-004 | 4.0720712e-004 | −2.1355571e-003 |
| 5.8269472e-004 | −3.1645605e-004 | 1.0359616e-003 |
| 1.2625981e-003 | −1.1299172e-003 | 3.4686463e-003 |
| 5.8568205e-004 | −1.2054011e-003 | 2.3017076e-003 |
| −6.9169227e-004 | −1.3528925e-004 | −1.3033846e-003 |
| −1.3468396e-003 | 1.3545552e-003 | −3.5122424e-003 |
| −7.5528505e-004 | 1.8587274e-003 | −2.1950732e-003 |
| 2.9639892e-004 | 6.7259262e-004 | 9.0952017e-004 |
| 8.0151216e-004 | −1.2585072e-003 | 2.4627466e-003 |
| 3.9699620e-004 | −2.1189607e-003 | 1.4310228e-003 |
| −2.4808942e-004 | −1.0485711e-003 | −2.7456300e-004 |
| −4.7205069e-004 | 8.8546085e-004 | −6.5254342e-004 |

| | | |
|---|---|---|
| −1.6871675e-004 | 1.7906968e-003 | −5.8866178e-005 |
| 1.1954296e-004 | 9.3185602e-004 | −1.9595068e-004 |
| 4.8294918e-005 | −5.6125928e-004 | −1.2983829e-003 |
| −2.6101927e-004 | −1.0835291e-003 | −1.5613938e-003 |
| −3.3020368e-004 | −3.4883234e-004 | 2.7904244e-004 |
| −2.0472460e-005 | 4.5184378e-004 | 2.6880755e-003 |
| 3.8970417e-004 | 2.6345840e-004 | 2.7515699e-003 |
| 4.3634266e-004 | −5.2915329e-004 | −1.6720590e-004 |
| 6.4005096e-005 | −6.6666764e-004 | −3.1712000e-003 |
| −4.2309072e-004 | 2.6816522e-004 | −2.9545126e-003 |
| −6.0175596e-004 | 1.2272745e-004 | 2.5905611e-004 |
| −3.8739920e-004 | 9.5649248e-004 | 2.8301079e-003 |
| 4.6138426e-005 | −3.9611280e-004 | 1.9674523e-003 |
| 4.2118721e-004 | −1.3997825e-003 | −9.6554591e-004 |
| 5.8352086e-004 | −1.0289918e-003 | −2.1774708e-003 |
| 4.1354023e-004 | 1.5662340e-003 | −1.8044619e-004 |
| −8.3048494e-005 | 8.2505934e-004 | 2.3128749e-003 |
| −6.9646685e-004 | 5.3771481e-004 | 1.7537382e-003 |
| −9.4469312e-004 | 1.1916583e-004 | −1.6618783e-003 |
| −4.9207857e-004 | 2.8313819e-004 | −3.9116903e-003 |
| 4.5243859e-004 | 5.0755568e-004 | −1.8681748e-003 |
| 1.1160296e-003 | −1.9499312e-004 | 2.7500891e-003 |
| 8.7905292e-004 | −1.5439576e-003 | 5.0320083e-003 |
| −1.0826943e-004 | −1.8485719e-003 | 2.3383240e-003 |
| −9.7689600e-004 | −5.3147447e-005 | −2.7012508e-003 |
| −1.0076075e-003 | 2.4508758e-003 | −5.0632262e-003 |
| −2.7389275e-004 | 2.9141738e-003 | −2.6853982e-003 |
| 4.8580966e-004 | 3.8026469e-004 | 1.6806345e-003 |
| 6.8226971e-004 | −2.7916392e-003 | 3.8149135e-003 |
| 3.4582014e-004 | −3.2553461e-003 | 2.3947188e-003 |
| −5.8753882e-005 | −4.4836932e-004 | −3.5753938e-004 |
| −2.2054644e-004 | 2.6046884e-003 | −1.7500720e-003 |
| −1.7965551e-004 | 2.6526237e-003 | −1.3548594e-003 |
| −1.4035916e-004 | −8.6796412e-005 | −5.5586116e-004 |
| −1.6534956e-004 | −2.2532074e-003 | −2.7455280e-004 |
| −6.4515341e-004 | −3.4765908e-003 | −1.1065689e-003 |
| 6.5572114e-004 | −1.0152386e-003 | 7.0746314e-003 |
| 1.3769471e-003 | 6.5120155e-004 | 2.2883681e-002 |
| 1.1107223e-003 | −7.9285955e-004 | 1.7424102e-002 |
| −1.3390026e-003 | −2.3296775e-004 | −6.8088693e-003 |
| −1.1816987e-003 | −2.5193695e-004 | −2.5604719e-003 |
| −1.1320028e-003 | 3.9964971e-003 | −1.8902197e-002 |
| −4.1494368e-004 | 4.9910828e-003 | 6.0803642e-003 |
| −2.9049744e-005 | 4.4074492e-004 | 2.2271718e-002 |
| −6.7042618e-005 | −5.0865625e-003 | 1.3345950e-002 |
| 3.2018846e-004 | −5.2996085e-003 | −7.9739034e-003 |
| 1.4046909e-003 | −8.5335508e-005 | −1.5674439e-002 |
| 1.9834104e-003 | 4.1126968e-003 | −1.7299670e-003 |
| 6.6707031e-004 | 2.4505713e-003 | 1.4515715e-002 |
| −2.0471120e-003 | −1.9603620e-003 | 1.0351959e-002 |
| −3.6800139e-003 | −2.1542202e-003 | −1.1607475e-002 |
| −2.2310198e-003 | 2.9227786e-003 | −2.4939977e-002 |
| 1.4561693e-003 | 5.9698528e-003 | −1.0296811e-002 |
| 4.2173485e-003 | 5.7764499e-004 | 2.0388998e-002 |
| 3.5902392e-003 | −8.9828325e-003 | 3.5179737e-002 |
| 1.3674443e-004 | −1.0942025e-002 | 1.6636875e-002 |
| −3.2399812e-003 | −1.8830792e-004 | −1.9126937e-002 |
| −4.0128055e-003 | 1.3507623e-002 | −3.9204227e-002 |
| −1.9552554e-003 | 1.4848815e-002 | −2.6642377e-002 |
| 1.1734858e-003 | 6.4794904e-004 | 5.8209885e-003 |
| 3.2486644e-003 | −1.5026286e-002 | −3.1649699e-002 |
| 3.0845921e-003 | −1.5630872e-002 | 3.4582266e-002 |
| 9.0191449e-004 | −6.9023696e-004 | 1.6580750e-002 |
| −1.8096614e-003 | 1.3505080e-002 | −1.0701205e-002 |
| −3.0654354e-003 | 1.2306193e-002 | −3.4299867e-002 |
| −1.8578166e-003 | −1.0696838e-003 | −4.0916315e-002 |
| | −1.0317448e-002 | |
| 7.0153243e-004 | −5.7111228e-003 | −2.0320220e-002 |
| 2.1274065e-003 | 5.0357831e-003 | 2.2240257e-002 |
| 1.0884861e-003 | 7.3462861e-003 | 5.8449238e-002 |
| −9.1262107e-004 | −1.7374073e-003 | 5.3462860e-002 |
| −1.0940983e-003 | −1.0048169e-002 | 4.0568396e-004 |
| 1.0900254e-003 | −5.8465670e-003 | −6.2440440e-002 |
| 2.7491191e-003 | 7.0836600e-003 | −7.8841479e-002 |
| 8.1375007e-004 | 1.3621376e-002 | −2.7674439e-002 |
| −3.6373661e-003 | 5.6048436e-003 | 5.0944518e-002 |
| −5.5929817e-003 | −8.3111476e-003 | 8.8338567e-002 |
| −1.6275432e-003 | −1.3134057e-002 | 5.0944518e-002 |
| 5.3088262e-003 | −5.0698099e-003 | −2.7674439e-002 |

| | | |
|---|---|---|
| 8.0629991e-003 | 5.3332189e-003 | −7.8841479e-002 |
| 3.0355823e-003 | 7.2692955e-003 | −6.2440440e-002 |
| −5.3823460e-003 | 2.3291441e-003 | 4.0568396e-004 |
| −8.8342702e-003 | −4.6569256e-005 | 5.3462860e-002 |
| −3.9691962e-003 | 2.9559234e-003 | 5.8449238e-002 |
| 3.9988673e-003 | 3.4460166e-003 | 2.2240257e-002 |
| 7.1475487e-003 | −4.7767276e-003 | −2.0320220e-002 |
| 3.3844692e-003 | −1.4357897e-002 | −4.0916315e-002 |
| −2.0730409e-003 | 1.3505080e-002 | −3.4299867e-002 |
| −1.0701205e-002 | −6.9023696e-004 | −1.8096614e-003 |
| 1.6580750e-002 | −1.5630872e-002 | 9.0191449e-004 |
| 3.4582266e-002 | −1.5026286e-002 | 3.0845921e-003 |
| 3.1649699e-002 | 6.4794904e-004 | 3.2486644e-003 |
| 5.8209885e-003 | 1.4848815e-002 | 1.1734658e-003 |
| −2.6642377e-002 | 1.3507623e-002 | −1.9552554e-003 |
| −3.9204227e-002 | −1.8830792e-004 | −4.0128055e-003 |
| −1.9126937e-002 | −1.0942025e-002 | −3.2399812e-003 |
| 1.6636875e-002 | −8.9828325e-003 | 1.3674443e-004 |
| 3.5179737e-002 | 5.7764499e-004 | 3.5902392e-003 |
| 2.0388998e-002 | 5.9695528e-003 | 4.2173485e-003 |
| −1.0296811e-002 | 2.9227786e-003 | 1.4561693e-003 |
| −2.4939977e-002 | −2.1542202e-003 | −2.2310198e-003 |
| −1.1607475e-002 | −1.9603620e-003 | −3.6800139e-003 |
| 1.0351959e-002 | 2.4505713e-003 | −2.0471120e-003 |
| 1.4515715e-002 | 4.1126968e-003 | 6.6707031e-004 |
| −1.7299670e-003 | −3.5335508e-005 | 1.9834104e-003 |
| −1.5674439e-002 | −5.2996085e-003 | 1.4046909e-003 |
| −7.9739034e-003 | −5.0865625e-003 | 3.2018846e-004 |
| 1.3345950e-002 | 4.4074492e-004 | −6.7042618e-005 |
| 2.2271718e-002 | 4.9910828e-003 | −2.9049744e-005 |
| 6.0803642e-003 | 3.9964971e-003 | −4.1494368e-004 |
| −1.8902197e-002 | −2.5193695e-004 | −1.1320028e-003 |
| −2.5604719e-003 | −2.3296775e-004 | −1.1816987e-003 |
| −6.8088693e-003 | −7.9285955e-004 | −1.3390026e-003 |
| 1.7424102e-002 | 6.5120155e-004 | 1.1107223e-003 |
| 2.2883681e-002 | −1.0152386e-003 | 1.3769471e-003 |
| 7.0746314e-003 | −3.4765908e-003 | 6.5572114e-004 |
| −1.1065689e-002 | −2.0730409e-003 | −6.4515341e-005 |
| −1.4357897e-002 | 3.3844692e-003 | −2.7455280e-004 |
| −4.7767276e-003 | 7.1475487e-003 | −5.5586116e-004 |
| 3.4460166e-003 | 3.9988673e-003 | −1.3548594e-003 |
| 2.9559234e-003 | −3.9691962e-003 | −1.7500720e-003 |
| −4.6569256e-005 | −8.3342702e-003 | −3.5753938e-004 |
| 2.3291441e-003 | −5.3823460e-003 | 2.3947188e-003 |
| 7.2692955e-003 | 3.0355823e-003 | 3.8149135e-003 |
| 5.3332189e-003 | 8.0629991e-003 | 1.6806345e-003 |
| −5.0698099e-003 | 5.3088262e-003 | −2.6853982e-003 |
| −1.3134057e-002 | −1.6275432e-003 | −5.0632262e-003 |
| −8.3111476e-003 | −5.5929817e-003 | −2.7012508e-003 |
| 5.6048436e-003 | −3.6373661e-003 | 2.3383240e-003 |
| 1.3621376e-002 | 8.1375007e-004 | 5.0320083e-003 |
| 7.0836600e-003 | 2.7491191e-003 | 2.7500891e-003 |
| −5.8465670e-003 | 1.0900254e-003 | −1.8681748e-003 |
| −1.0048169e-002 | −1.0940933e-003 | −3.9116903e-003 |
| −1.7374073e-003 | −9.1262107e-004 | −1.6618783e-003 |
| 7.3462861e-003 | 1.0884861e-003 | 1.7537382e-003 |
| 5.0357831e-003 | 2.1274065e-003 | 2.3128749e-003 |
| −5.7111228e-003 | 7.2153243e-004 | −1.8044619e-004 |
| −1.0317448e-002 | 1.8578166e-003 | −2.1774708e-003 |
| −1.0696838e-003 | 3.0654354e-003 | −9.6554591e-004 |
| 1.2306193e-002 | 9.5649248e-004 | 1.9674523e-003 |
| 2.8301079e-003 | 1.2272745e-003 | −3.8739820e-004 |
| 2.5905611e-004 | 2.6816522e-004 | −6.0175596e-004 |
| −2.9545126e-003 | −6.6666764e-004 | −4.2309072e-004 |
| −3.1712000e-003 | −5.2915329e-004 | 6.4005096e-005 |
| −1.6720590e-004 | 2.6345840e-004 | 4.3834266e-004 |
| 2.7515699e-003 | 4.5184378e-004 | 3.8970417e-004 |
| 2.6880755e-003 | −3.4888234e-004 | −2.0472460e-005 |
| 2.7904244e-004 | −1.0835291e-003 | −3.3020368e-004 |
| −1.5613938e-003 | −5.6125928e-004 | −2.6101927e-004 |
| −1.2983829e-003 | 9.3185602e-004 | 4.8294918e-005 |
| −1.9595068e-004 | 1.7906968e-003 | 1.1954296e-004 |
| −5.8866178e-005 | 8.8546085e-004 | −1.6871675e-004 |
| −6.5254342e-004 | −1.0485711e-003 | −4.7205069e-004 |
| −2.7456300e-004 | −2.1189607e-003 | −2.4808942e-004 |
| 1.4310228e-003 | −1.2585072e-003 | 3.9699620e-004 |
| 2.4627466e-003 | 6.7259262e-004 | 8.0151216e-004 |
| 9.0952017e-004 | 1.8587274e-003 | 2.9639892e-004 |
| −2.1850732e-003 | 1.3548552e-003 | −7.5528505e-004 |

-continued

| | | |
|---|---|---|
| -3.5122424e-003 | -1.3528925e-004 | -1.3468396e-003 |
| -1.3033846e-003 | -1.2054011e-003 | -6.9169227e-004 |
| 2.3017076e-003 | -1.1299172e-003 | 5.8568205e-004 |
| 3.4686463e-003 | -3.1645605e-004 | 1.2625981e-003 |
| 1.0359616e-003 | 4.0720712e-004 | 5.8269472e-004 |
| -2.1355571e-003 | 5.9976039e-004 | -5.8692698e-004 |
| -2.5300484e-003 | 3.9113510e-004 | -1.1427863e-003 |
| -4.9091997e-005 | 8.8512726e-005 | -6.5246694e-004 |
| 2.0450193e-003 | -1.1491986e-004 | -1.9397956e-004 |
| 1.1924051e-003 | -1.8883509e-004 | -2.4501353e-004 |
| -1.3812248e-003 | -1.6534956e-004 | -5.7206581e-004 |
| -2.2532074e-003 | -1.4035916e-004 | |
| -8.6796412e-005 | -1.7985551e-004 | |
| 2.6526237e-003 | -2.2054644e-004 | |
| 2.6046884e-003 | -5.8753882e-005 | |
| -4.4836932e-004 | 3.4582014e-004 | |
| -3.2553461e-003 | 6.8226971e-004 | |
| -2.7916382e-003 | 4.8580966e-004 | |
| 3.8026469e-004 | -2.7389275e-004 | |
| 2.9141738e-003 | -1.0076075e-003 | |
| 2.4508758e-003 | -9.7639600e-004 | |
| -5.3147447e-005 | -1.0326943e-004 | |
| -1.8485719e-003 | 8.7905292e-004 | |
| -1.5439576e-003 | 1.1160296e-003 | |
| -1.9499312e-004 | 4.5243859e-004 | |
| 5.0755568e-004 | -4.9207357e-004 | |
| 2.8313819e-004 | -9.4469312e-004 | |
| 1.1916883e-004 | -6.9646685e-004 | |
| 5.3771481e-004 | -8.3048494e-005 | |
| 8.2505934e-004 | 4.1354023e-004 | |
| 1.5662340e-004 | 5.8352086e-004 | |
| -1.0289918e-003 | 4.2118721e-004 | |
| -1.3997825e-003 | 4.6138426e-005 | |
| -3.9611280e-004 | | |

The used digital filter allows employing every bin as a carrier frequency, the orthogonality being maintained as well as possible. Because of the characteristics of the filter the damping requirements in the data transmission can be well satisfied for frequencies outside the allowed frequency bands. Because the filtering results in a time expansion of the signal blocks, no overlapping is possible in contrast to the use of a time window, but a time separation is required between the signal blocks. This amounts to about 10% of the block duration.

The use of digital filters is especially advantageous, when the signal-to-noise ratio of the transmission channel is low.

The data transmission according to the invention by applying a window function and a digital filter, respectively, on the signal block to be transferred allows ISDN data transmission rates when using the electric network as a transmission channel while maintaining the European standard.

What is claimed is:

1. Data transmission method, especially in electric networks, comprising the following steps:
   providing the data to be transmitted as a plurality of data blocks;
   performing the following substeps for each data block:
      modulating the data block onto several carrier frequencies within one or several frequency bands by an orthogonal frequency division multiplex method (OFDM) thereby obtaining a frequency domain representation of a signal corresponding to the data block,
      performing an inverse Fourier transformation on the frequency domain representation to obtain a time domain signal, and
      multiplying the time domain signal by a window function to obtain a signal block corresponding to the data block; and
      sequentially transmitting the signal blocks corresponding to the data blocks, each for a predetermined time duration (T), to a receiver;
   wherein said window function has a Fourier transform, and an absolute value of the Fourier transform has:
      a zero crossing at the respectively used carrier frequencies, and
      secondary maxima, which have a damping of at least minus 30 dB in relation to a main maximum of the damping.

2. Method of claim 1, characterized in that a window function is used, the absolute value of the Fourier transform of which has a zero crossing at least at every second interesting carrier frequency.

3. Method of claim 1, characterized in that a window function is used, the absolute value of the Fourier transform of which has secondary maxima having a damping of at least −50 dB to −60 dB in relation to the main maximum from the second secondary maximum.

4. Method of claim 1, characterized in that the function $$window(n) = c_o + \sum_{i=1}^{I} c_i \cos\left((2i-1)2\pi \frac{(n+0.5)}{NFFT}\right)$$

is used as a window function, where n=0, . . . , NFFT−1

NFFT: number of points used for the inverse Fourier transformation, and the coefficients $c_i$; can be chosen as: $c_o$=0.5093; $c_1$=−0.4941; $c_2$=0.0059 in the case of I=2.

5. Method of claim 1, characterized in that the data are coded by quadrature amplitude modulation (QAM).

6. Method of claim 1, characterized in that one or more bands of the European standard (Cenelec EN 50065), especially the B band and the D band of this standard in the range of 95–125 kHz and 140–148.5 kHz, respectively, are used as frequency band.

7. Method of claim 1, characterized in that the signals are transferred in the low voltage distribution network.

8. Method of claim 1, characterized in that the signal is generated in a digital signal processor (DSP) in the frequency space, is transformed in the time space by inverse Fourier transformation, is multiplied therein with the window function and is subsequently converted by a Digital to Analog converter and fed into the transmission carrier.

9. Method of claim 1, characterized in that the signal blocks are transferred overlapping in time.

10. Method of claim 1, characterized in that the number of carrier frequencies is distributed among a transmission channel, a return channel and a synchronization channel.

11. Method of claim 10, characterized in that for each of the return channel and the synchronization channel a carrier frequency is used.

12. Method of claim 1, characterized in that the data of a signal block are error corrected, especially by Bose Chaudhuri Hoequenghem coding.

13. Method of claim 10, characterized in that the transmission channel and the return channel each have several different or equal carrier frequencies.

* * * * *

UNITED STATES PATENT AND TRADEMARK OFFICE
CERTIFICATE OF CORRECTION

PATENT NO. : 6,751,262 B1
DATED : June 15, 2004
INVENTOR(S) : Wolfgang Täger

It is certified that error appears in the above-identified patent and that said Letters Patent is hereby corrected as shown below:

Title page,
Item [56], References Cited, U.S. PATENT DOCUMENTS, please add the following:
-- 6,314,083    6,088,398    5,995,557 --.

Column 2,
Line 27, please delete "Preferred embodiments are set out in these subclaims." and add -- This object is met by the features of claims 15 or 28. Preferred embodiments are set out in these subclaims. --.

Column 4,
Line 29, please delete "$(c_{-k}=C_k)$" and add -- $(c_{-k}=c_k)$ --.
Line 60, please delete "ck" and add -- $c_k$ --.

Column 6,
Line 63, please delete "-2.1950732e-003" and add -- – 2.1850732e-003 --.

Column 7,
Line 9, please delete "3.6970417e-004" and add -- – 3.68970417e-004 --.
Line 10, please delete "4.3634266e-004" and add -- – 4.3834266e-004 --.
Line 14, please delete "3.8739920e-004" and add -- – 3.8739820e-004 --.
Line 29, please delete "-1.7965551e-004" and add -- -1.7985551e-004 --.

Column 9,
Line 19, please delete "-9.7639600e-004" and add -- -9.7689600e-004 --.
Line 20, please delete "-1.0326943e-004" and add -- -1.0826943e-004 --.
Line 24, please delete "-4.9207357e-004" and add -- -4.9207857e-004 --.

Signed and Sealed this

Twenty-eighth Day of September, 2004

JON W. DUDAS
*Director of the United States Patent and Trademark Office*